June 25, 1929.  D. A. GAUTHIER  1,718,553
TESTING DEVICE
Filed July 18, 1927
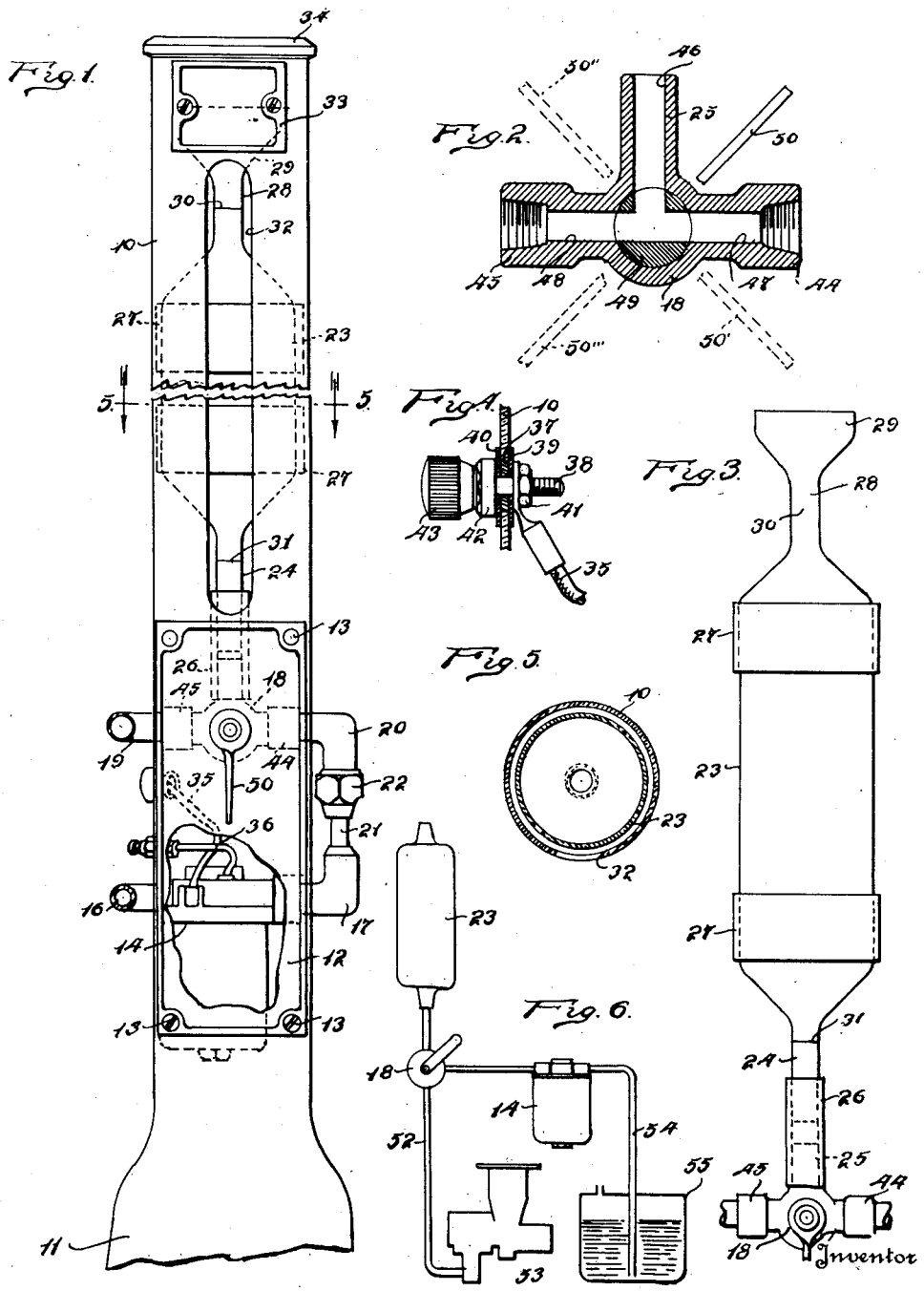
Inventor
DONAT A. GAUTHIER
By J. King Harness
Attorney Patented June 25, 1929.

1,718,553

UNITED STATES PATENT OFFICE.

DONAT A. GAUTHIER, OF DETROIT, MICHIGAN.

TESTING DEVICE.

Application filed July 18, 1927. Serial No. 206,399.

This invention relates to testing devices and particularly to such devices as are adapted to accurately determine the relation between the fuel consumption and the mileage of motor vehicles and the like. The principal object is to provide a testing device by which the average vehicle owner may quickly, easily and accurately determine the relation between the fuel consumption and the mileage of his vehicle.

A further object is to provide a simple and compact article of manufacture within the means of the average vehicle owner by which he may easily and accurately determine the distance which his vehicle travels per unit of fuel.

The above being among the objects of the present invention the same consists in certain features of construction and combinations of parts to be hereinafter described with reference to the accompanying drawing, and then claimed, having the above and other objects in view.

In the accompanying drawing,—

Fig. 1 is a side elevation of a suitable embodiment of the present invention.

Fig. 2 is a sectional view taken axially of the passages of the three-way valve employed in the device shown in Fig. 1.

Fig. 3 is a side elevation of the tube, bulb or fuel measuring member employed in the device shown in Fig. 1, the same being shown with the supporting pads around the same and operatively connected to three-way valve.

Fig. 4 is a fragmentary sectional view taken radially through the shell of the device shown in Fig. 1 centrally through one of the electrical terminals for the fuel pumping means.

Fig. 5 is a sectional view taken on the lines 5—5 of Fig. 1.

Fig. 6 is a diagrammatic sketch illustrating the system of operation of the device shown in Fig. 1.

It often occurs that the average motor vehicle owner desires to know accurately the distance which his vehicle travels on a given amount of fuel under particular circumstances. The only method the average owner has to determine the same is to note the speedometer reading when his fuel gage reads at a particular figure and after running a determined distance dividing the distance by the difference in fuel gage readings, thereby giving him an approximate figure. Inasmuch as the scales on such fuel gages are not devised so as to be capable of close reading, and as such gages themselves are notoriously inaccurate and at the best serve only as an approximation of the amount of fuel in the tank, and further as it is necessary to travel a considerable distance before it is possible to be able to determine by the gage the amount of fuel used, during which time the vehicle is usually forced to run at different speeds and over various grades, the final result is correspondingly inaccurate. While the motorist may sometimes obtain sufficient apparatus to carry on a practical and accurate test under predetermined conditions, it is almost impossible and very inconvenient in the majority of cases for this to be done, with a result that except in properly equipped laboratories it is almost impossible to obtain an accurate mileage test.

With the above in mind I have provided a device within the financial ability of the average vehicle owner by which he may quickly and accurately determine the distance his vehicle will travel on a given amount of fuel and under certain conditions. This device as indicated in the accompanying drawing comprises a vertically disposed tubular member 10 provided with a flared base 11. The member 10 is preferably formed of sheet metal and the base formed integrally therewith by spinning or the like and preferably flattened to provide a line contact supporting surface. A portion of the surface of the member 10 is cut away adjacent the lower end thereof and for substantially half of the circumference of the same to provide an opening which is closed by the removable cover 12 secured thereto by the screws 13, the cover 12 being formed to substantially the same shape as the metal removed to provide the opening beneath the same. Within the interior of the member 10 and immediately back of the cover 12 I place a fuel pump 14, preferably of the electrically actuated type now common on the market in which a metallic bellows member (not shown) is expanded and contracted by a solenoid or magnet (not shown) to cause the flow of fuel through the same. The fuel pump 14 is held in fixed position within the member 10 by the angle connections 16 and 17 which are threaded through openings in the side of the member 10 and into the inlet and discharge openings respectively of the fuel pump 14. Positioned above the fuel pump 14 and spaced therefrom within the member 10 and back of the cover 12, I provide a three-way valve or cock the body of which is indicated by the numeral 18, it being secured in fixed relation within the member 10 by the angle connections 19 and 20 in a manner similar to which the fuel pump 14 is secured in place. A short tube 21 and connection 22 joins the angle connections 17 and 20 to provide a continuous passage between the same. Positioned above the valve 18 within the member 10 is a tube, bulb or measuring member 23 having a lower reduced end 24 which is joined to the upwardly projecting boss 25 of the valve 18 by the sleeve 26 which may be formed of rubber or other suitable material so as to provide a fluid tight joint between the same. Padding bands 27 are provided about the bulb 23 and are adapted to hold the same out of contact with the walls of the member 10 and to prevent the same from relative movement in respect thereto. The bulb 23 is supported within the tube 10 from the valve 18 through the sleeve 26. The upper end of the bulb is reduced as at 28 and preferably flared outwardly again to form a funnel like upper end 29. The size of the bulb is preferably such that from a line such as 30 in the narrow neck portion 28 to a similar line 31 in the narrow neck portion 24, it holds a decimal part of the unit of measurement of fuel which the owner wishes to employ in testing, preferably one-tenth of a gallon in those countries in which a gallon is the standard unit of measurement for fluids. A slot such as 32 is provided in the face of the member 10 extending from a point above the line 30 to a point below the line 31 in order that the level of fuel within the bulb 23 may be at all times under direct attention of the eye. If desired a portion of the member 10 may be removed in line with the slot 32 in the plane of the funnel end 29 and provided with a removable cover 33 which may be removed, if an occasion should arise, to inspect the level of the fuel within the funnel end 29 for the purpose of introducing fuel into the bulb 23 through the same. A cover such as 34 is preferably provided in the upper end of the member 10 to close the same.

The lead wires 35 and 36 from the pump 14 are each preferably secured to the side walls of the member 10 as indicated in Fig. 4 in which an opening 37 is provided, a stud 38 extending through the same and insulated from the walls of the member 10 by the washers 39 and 40, the lead wires being secured to the inner ends of the studs 38 by a nut such as 41. A nut member 42 threaded on the stud exteriorly of the member 10 prevents axial movement or rotation of the same and a thumb screw 43 is further provided for the attachment of leads to a source of electric energy such as a battery.

Fig. 2 illustrates the construction of the valve 18 which is provided with the boss portions 44 and 45 through which and the boss 25, the openings 46, 47 and 48 respectively extend. The rotatable plug portion of the valve 49, which may be rotated by the handle 50 secured thereto is provided with three connecting openings which act to connect the openings 46, 47 and 48 when the plug portion 49 is turned by the handle 50 to the position shown by full lines in Fig. 2. The angle connection 20 is threadably received within the boss portion 44 and the angle connection 19 is threadably received within the boss portion 45 in the usual manner.

In practice the above described device is employed in the following manner. The device is supported vertically on the floor of the driving compartment of the vehicle to be tested. The fuel pipe leading to the carburetor from the vacuum tank, fuel pump or other fuel supplying means employed on the vehicle is detached from the carburetor and plugged if necessary. A tube such as 52, as indicated in the diagrammatic sketch in Fig. 6, is then employed to connect the angle connection 19 with the carburetor 53. Another tube such as is indicated by 54 in the diagrammatic sketch in Fig. 6 is employed to connect the angle connection 16 with a suitable source of fuel such as a tank, jar or the like 55 which may be placed beside the testing device in the driving compartment of the vehicle being tested, or any other suitable place on the same. An electric connection is then made between the studs 38 on the ends of the wires 35 and 36 of the fuel pump and a suitable source of electrical energy such as a battery or switch terminals on the vehicle. Upon connection of the wires 35 and 36 with a suitable source of electrical energy the fuel pump 14 immediately begins to pass fuel from the tank or jar 55 through the tube 54 and through the pump 14 to the valve 18. If the valve plug 49 is turned to the position indicated in Fig. 2, in which position the handle 50 assumes a corresponding position indicated by the solid lines, the fuel is caused to pass through the passage 47 through the plug 49 and into the passage 48 from which it is conducted by the angle connection 19 and tube 52 to the carburetor 53. At the same time the fuel is also caused to flow up through the passage 46 and through the sleeve 26 and neck portion 24 into the interior of the bulb 23. If the handle 50 is turned to the position indicated by the dotted line 50' in Fig. 2 the plug portion 49 will be rotated and the fuel in the passage 47 will be caused to flow up into the tube 23 and the flow of the fuel through the passage 48 to the carburetor 53 will be cut off. If the handle 50 is now rotated to the position indicated as 50'' in Fig. 2 the passage of the fluid through the passage 47 will now be stopped and fuel will be allowed to flow only from the bulb 23 downwardly through the passages 46 and 48 to the carburetor 53. If the handle 50 is turned to the position indicated by the numeral 50''' the fuel entering the passage 47 will pass directly to the passage 48 and any passage of fuel through the passage 46 will be prevented.

In practice I prefer to use the above described device in the following manner. After connecting it up with the carburetor 53 and with a tank or jar of fuel 55 as above described, I place the handle 50 in the position indicated by the full line 50 in Fig. 2 and allow the fuel to pass up through the passage 46 in the bulb 23 until it reaches the line 30 at which time I turn the handle 50 to the positon indicated by the dotted line 50''' in which position the fuel within the bulb 23 is held at a constant level at the line 30 and all the fuel passing through the pump 14 is passed directly to the carburetor 53. An alternate method of filling the bulb 23 is to turn the handle 50 to the position indicated by the dotted lines 50' in which position all the fuel from the pump 14 passes into the bulb 23. In either case, when the fuel in the bulb 23 has reached the line 30, the handle 50 is turned to the position indicated by the dotted lines 50'''. I then drive the vehicle to the particular stretch of road upon which I desire to do the testing. Upon reaching this desired stretch of road I observe the speedometer mileage indicating scale and as it reaches a predetermined point and the vehicle is traveling at a predetermined speed I turn the handle 50 to the position indicated as 50'' in Fig. 2, in which the passage of fluid from the passage 47 is stopped and the only fuel passing to the carburetor is that from the bulb 23. Watching the level of the fuel in the bulb 23 through the slot 32 and keeping the vehicle at a constant desired speed, I continue to drive the vehicle along the road until the level of the fuel in the bulb 23 has dropped to the line 31 at which time I note the speedometer again and take the reading of the same. By then obtaining the difference between the first and last reading on the speedometer and knowing the volume of the fuel carried by the bulb 23 between the lines 30 and 31, I am enabled by a simple mathematical calculation to determine the rate at which the fuel was consumed in relation to the distance which was covered. If the volume of the tube 23 between the lines 30 and 31 is one-tenth of a gallon or other unit as suggested above, I have only to multiply the speedometer reading by ten in order to obtain the distance which the vehicle at that speed and on the same type of road will travel on a whole unit of measurement of the fuel, thus substantially eliminating any calculation whatsoever.

While I have above described in the method of operation that I introduce only sufficient fuel in the bulb 23 to bring it up to the level of the line 30, it is of course understood, that this is desirable but not necessary, but that the fuel may be allowed to extend over the line 30, and when the fuel is being drawn from the bulb 23 during a testing operation the first speedometer reading may be taken the moment the level of the fuel becomes coincident with the line 30, the remaining operations being carried out as described above.

The bulb 23 is provided with the reduced neck portions 24 and 28 in order that the volume of fuel being used may be quickly determined and with as little guess work as is practically possible, the fuel in the neck portions 24 and 28 being but slightly affected by any inclination of the axis of the bulb 23 out of the vertical and the fuel in passing the same as it is drawn out of the bulb 23 moving with comparative rapidity as compared with its movement within the body of the bulb 23.

From the above it will be apparent that I have provided a device by which the fuel consumption of a motor vehicle under predetermined conditions may be accurately and quickly determined by a vehicle owner of ordinary intelligence and that the device because of its simplicity may be manufactured and sold at a price at which the ordinary vehicle owner may deem within his means for a device of this nature, and at the same time the device is compact and relatively self contained whereby the use of the same is exceedingly simplified.

Although I have described the above device as employed in connection with the testing of automobiles only, it will be apparent that its use is not restricted to this purpose only, but may equally well be employed in the testing of boats or aeroplanes, or in connection with dynamometer tests or engines or, in fact, for any purpose where the rate of consumption of fuel is desired to be determined.

Formal changes may be made in the specific embodiment of the invention described without departing from the spirit or substance of the broad invention, the scope of which is commensurate with the appended claims.

What I claim is:

1. In combination, a tubular casing, a pump in said casing, fittings for the inlet and outlet of said pump extending through the walls of said casing and supporting the pump thereby, a three way valve in said casing, fittings for said valve extending through the walls of said casing and supporting said valve thereby, and a visual measuring container within said casing connected to said valve.

2. In combination, a tubular casing, a pump within said casing, inlet and outlet members for said pump projecting through the walls of said casing and supporting said pump therefrom, a valve device within said casing, inlet and outlet connections for said valve projecting through the walls of said casing and supporting said valve device therefrom, the outlet from said pump and the inlet to said valve being connected, and a visual measuring device within and protected by said casing connected to said valve device.

3. In combination, a tubular casing, a pump within said casing, inlet and outlet members for said pump projecting through the walls of said casing and supporting said pump therefrom, a valve device within said casing, inlet and outlet connections for said valve projecting through the walls of said casing and supporting said valve device therefrom, the outlet from said pump and the inlet to said valve being connected, and a visual measuring device within and protected by said casing connected to said valve device, said measuring device being supported by said valve device.

4. A portable fuel mileage testing device comprising, in combination, a tubular metal shell, an electric fuel pump within said shell, an inlet connection member for said pump projecting through the walls of said shell and being formed exteriorly thereof to readily receive a flexible tube, a three way valve within said shell connected to the outlet of said pump and being provided with a discharge connection projecting through the walls of said shell and formed exteriorly thereof to readily receive a flexible tube, a transparent measuring bulb within said shell connected to said valve, and a slot in said casing for permitting visual inspection of said bulb from the outside of said shell, said valve permitting said pump to be connected to said bulb or to said discharge connection separately, or to both simultaneously.

5. A portable fuel mileage testing device comprising, in combination, a support, fuel pumping means carried by said support and having an inlet and an outlet, a measuring bulb carried by said support, a discharge connection adapted to be connected to a carburetor, means connecting the outlet of said pump with said bulb and with said discharge connection, and a three-way valve included in said means and operable at will to connect said pump outlet with said bulb only, to connect said pump outlet with said discharge connection only, to connect said bulb with said discharge connection only, or to connect said pump outlet simultaneously with both said bulb and discharge connection.

6. A portable fuel mileage testing accessory for automobiles comprising, in combination, a support, an electric pump carried by said support, a measuring bulb carried by said support, a discharge connection, an inlet connection for the inlet side of said pump, and means connecting the outlet side of said pump with the bottom end of said bulb and with said discharge connection, said means including a three-way valve operable at will to connect said pump and said bulb independently of said discharge connection, to connect said pump and said discharge connection independently of said bulb, to connect said bulb and said discharge connection independently of said pump, or to connect said pump to said bulb and to said discharge connection simultaneously.

7. A portable fuel mileage testing device for automobiles comprising, in combination, a support, an electric fuel pump on said support, a measuring bulb on said support having reduced end portions each of which is provided with a mark thereon defining limits between which a decimal part of a unit of fuel measurement may be contained in said bulb, a three-way valve on said support, said three-way valve being connected to the outlet side of said pump, to the lower end of said bulb and to said discharge connection and being movable at will to selectively connect said pump, said bulb and said discharge connection in pairs only, or to connect all of them together simultaneously.

DONAT A. GAUTHIER